United States Patent

Schmid et al.

[15] 3,678,127
[45] July 18, 1972

[54] CARBOXY TERMINATED POLYAMIDES AND DIEPOXIDES

[72] Inventors: Rolf Schmid, Gelterkinden; Friedrich Lohse, Oberwil Basel-land; Hans Batzer, Arlesheim, all of Switzerland

[73] Assignee: Ciba-Geigy AG, Basel, Switzerland

[22] Filed: Oct. 19, 1970

[21] Appl. No.: 82,073

Related U.S. Application Data

[63] Continuation-in-part of Ser. No. 756,354, Aug. 30, 1968, Pat. No. 3,558,742.

[30] Foreign Application Priority Data

Sept. 11, 1967 Switzerland..........................12701/67

[52] U.S. Cl..........................260/830 P, 161/184, 161/185, 260/2 EP, 260/13, 260/37 EP, 260/45.95, 260/47 EP, 260/47 EC, 260/78 R, 260/78.4 EP, 260/835, 260/836, 260/837 R

[51] Int. Cl..........................................................C08g 45/12

[58] Field of Search................................................260/830 P

[56] References Cited

UNITED STATES PATENTS

| | | | |
|---|---|---|---|
| 3,576,903 | 4/1971 | Groff | 260/835 |
| 3,336,415 | 8/1967 | Kennedy | 260/830 P |
| 3,363,025 | 1/1968 | Futko | 260/830 P |
| 3,371,008 | 2/1968 | Lopez | 260/830 P |
| 3,379,561 | 4/1968 | Manaka | 260/830 P |
| 3,406,053 | 10/1968 | Jaenicke | 260/830 P |
| 3,458,481 | 7/1969 | Reichold | 260/830 P |
| 3,449,280 | 6/1969 | Frigstad | 260/830 P |
| 3,462,337 | 8/1969 | Gorton | 260/830 P |
| 3,496,248 | 2/1970 | Lincoln | 260/830 P |

*Primary Examiner*—Paul Lieberman
*Attorney*—Harry Goldsmith, Joseph G. Kolodny and Mario A. Monaco

[57] ABSTRACT

A curable composition which can be converted into crystalline plastics at an elevated temperature, characterized in that it contains long-chain polyamide-dicarboxylic acids of the formula

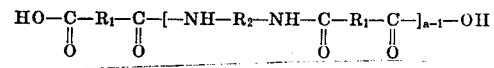

in which $R_1$ and $R_2$ each are members selected from the group consisting of branched alkylene, linear alkylene, branched alkenylene and linear alkenylene residue, and a is an integer of at least 2, preferably 2 – 10, as well as diepoxy compounds and, if desired, also antioxidants, and in which for every epoxide group equivalent 0.7 to 1.2, preferably 0.9 to 1.1 equivalent of carboxyl groups is present.

9 Claims, No Drawings

CARBOXY TERMINATED POLYAMIDES AND DIEPOXIDES

This application is a continuation-in-part application of our copending application, Ser. No. 756,354, filed Aug. 30, 1968 now U.S. Pat. No. 3,558,742.

It is known that crosslinked plastics having considerable flexibility are obtained by the polyaddition of long-chain aliphatic dicarboxylic acids on to polyepoxides, for example polyglycidyl ethers of bisphenol A. This procedure is governed by the rule that the flexibility of the products increases as the share of the aliphatic chains is increased. However, the products become increasingly softer and finally have only moderate elongation at rupture combined with a very minor mechanical strength.

It has now been found that by the polyaddition of certain long-chain polyamide-dicarboxylic acids, whose chain contains alternating carboxylic acid amide groups, on to diepoxides novel plastics are obtained incorporating an unexpected combination of mechanical and physical properties that is advantageous for many industrial uses.

The incorporation of polyamide-dicarboxylic acids introduces into the threedimensionally crosslinked final product regular structural elements with hydrogen bridges, which renders these novel plastics crystalline and tough within a relatively wide temperature range and imparts to them a surprisingly high tensile strength combined with a high elongation at rupture. The high tensile strength thus achieved remains intact up to temperatures between 140° and 170° C. The long-chain dicarboxylic acids used for the polyaddition must satisfy certain structural preconditions:

They must be composed of branched or linear alkylene or alkenylene chains alternating with carboxylic acid amide groups. The stoichiometric portions of the reactants must further be chosen so that for every equivalent of epoxide groups of the diepoxy compound 0.9 to 1.5 equivalents of carboxyl groups of the polyamide-dicarboxylic acid are used.

Accordingly, the present invention provides a process for the manufacture of crystalline polyadducts, characterized in that polyamide-dicarboxylic acids of the formula

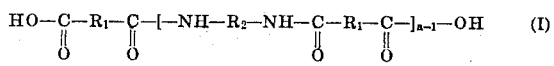

$$HO-\underset{O}{\underset{\|}{C}}-R_1-\underset{O}{\underset{\|}{C}}-[-NH-R_2-NH-\underset{O}{\underset{\|}{C}}-R_1-\underset{O}{\underset{\|}{C}}-]_{a-1}-OH \qquad (I)$$

in which $R_1$ and $R_2$ each are members selected from the group consisting of branched alkylene, linear alkylene, branched alkenylene and linear alkenylene residue, and a is an integer of at least 2, preferably 2 – 10, are reacted with diepoxy compounds at an elevated temperature to form polyadducts, these epoxy compounds preferably having an epoxide equivalent weight not exceeding 500, using for every equivalent of epoxide groups 0.6 to 1.2, preferably 0.8 to 1.0 equivalent of carboxyl groups.

Particularly suitable diepoxy compounds are the N,N'-diglycidyl compounds, such as the N,N'-diglycidyl hydantoins, which are derived from heterocyclic nitrogen bases and are extremely well compatible with polyamide-dicarboxylic acids.

The diepoxy compounds used may also be diglycidyl ethers or esters of the formula

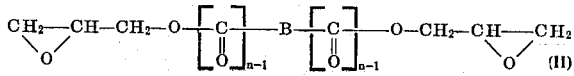

$$CH_2-CH-CH_2-O-\left[\underset{O}{\underset{\|}{C}}\right]_{n-1}-B-\left[\underset{O}{\underset{\|}{C}}\right]_{n-1}-O-CH_2-CH-CH_2 \qquad (II)$$

in which B represents a bivalent aliphatic, cycloaliphatic, araliphatic or aromatic residue and $n = 1$ or 2.

When shaped structures prepared from the crystalline plastic products manufactured according to this invention are subjected to tensile stresses, they are stretched and during this mechanical processing their degree of crystallinity is raised.

The energy absorption capacity (= half the product of elongation at rupture $x$ tensile strength, or area of the parallelogram resulting from the tensile strength test) is surprisingly high and surpasses that of the known epoxy resin products crosslinked with the conventional curing agents by a power of 10.

Compared with thermoplastic polyamides the systems of this invention have, in addition to the more favorable processing properties, the following considerable advantages:

The fully cured shaped structures have an increased resistance to creep and are rubber-elastic above the crystallization conversion temperature, whereas, for example the comparable thermoplastic polyamides turn liquid.

The hardness and especially the resilience in the rubber-elastic state of the shaped structures can be improved by increasing the crosslinking density; this is preferably achieved by adding a polycarboxylic acid anhydride and/or an excess of diepoxy compound, a tricarboxylic acid or a triepoxy compound.

When a polycarboxylic acid anhydride is used as cross-linking agent, it is in general preferable to use for every equivalent of carboxyl group of the dicarboxylic acid 0.05 to 0.5, especially 0.1 to 0.2 mol of a dicarboxylic acid anhydride and an excess of 0.05 to 0.5, especially 0.1 to 0.2 epoxide group equivalent of the diepoxy compound over and above the quantity needed for the reaction with the dicarboxylic acid, as a crosslinking agent for the polyadduct chain.

When a triepoxide is used as crosslinking agent it is as a rule advantageous to use 0.05 to 0.5, preferably 0.1 to 0.2 equivalent of epoxide groups of the triepoxy compound for every equivalent of epoxide groups of the diepoxy compound, and in this case an appropriate excess of polyamide-dicarboxylic acid must be used, that is to say the 0.6 to 1.2 equivalents of carboxyl groups of the polyamide-dicarboxylic acid used are in such a case referred to 1 epoxide equivalent of the mixture of the diepoxide with the triepoxide.

The use of more than 30 mol% of crosslinking agent, referred to the carboxyl group equivalent of the dicarboxylic acid, should as a rule be avoided because this would greatly increase the crosslinking density and in general furnish shaped structures of insufficient elongation at rupture.

The crystalline plastics obtained by the present process probably consist of mainly linear high-molecular chain molecules of the polyadduct of diepoxide and polyamide-dicarboxylic acid.

In the crystalline products additionally crosslinked by the addition of a share of a crosslinking agent, especially a dicarboxylic acid anhydride, it is assumed that at least 0.05 and at most 0.5, especially 0.1 to 0.2 mol% of the hydroxyl groups distributed along the polyadduct chains are in esterified form, every two such esterified hydroxyl groups from vicinal polyadduct chains being bound together through a bivalent organic residue so that a wide-mesh threedimensional lattice of polyadduct chains with some linking points between the chains is formed.

However, it must be pointed out that even in the absence of an additional crosslinking agent a minor crosslinking occurs so that even these cured shaped structures are infusible.

The manufacture of the acid polyamide-dicarboxylic acids is carried out in accordance with the following general principle:

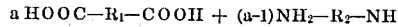

$$a\ HOOC-R_1-COOH + (a-1)NH_2-R_2-NH_2$$

$$\downarrow$$

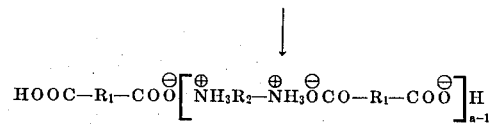

$$HOOC-R_1-COO^{\ominus}\left[\overset{\oplus}{N}H_3R_2-\overset{\oplus}{N}H_3\overset{\ominus}{O}CO-R_1-COO^{\ominus}\right]_{a-1}H$$

$$\downarrow \Delta T$$

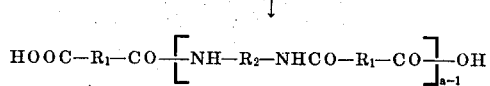

$$HOOC-R_1-CO-\left[-NH-R_2-NHCO-R_1-CO-\right]_{a-1}-OH$$

with the values for a being at least 2 and preferably 2 to 10, so that the final product contains as an average value at least 2 and preferably 2 to 18 amide groups of the structure — CONH— per molecule.

In the manufacturing process of the polyamide-dicarboxylic acids, the salts of them are prepared in a first step, mostly in the presence of solvents, and subsequently obtained at elevated temperatures above 180° C., advantageously at 220° - 250° C., in atmosphere of nitrogen; the final products are obtained with splitting-off of water.

Suitable aliphatic dicarboxylic acids HOOC—$R_1$—COOH are:
adipic acid, pimelic acid, suberic acid, azelaic acid, sebacic acid and dodecane-1,12-dicarboxylic acid. Possible diamines $NH_2$—$R_2$—$NH_2$ are ethylene diamine, 1,3-diaminopropane, 1,4-diaminobutane, 1,6-diaminohexane, 1,10-diaminodecane and 1,2-diaminododecane.

As diepoxides to be reacted with the dicarboxylic acids of the formula (I) according to the present process there may be specially used those whose molecular weight is not too high, using as a rule diepoxides having an epoxide equivalent weight not exceeding 500. Diepoxides having a relatively low molecular weight, especially those having an epoxide equivalent weight of about 100 to 250, are in general particularly suitable for the manufacture of crystalline products.

Especially suitable diepoxy compounds are those containing on an average more than one glycidyl group or 2,3-epoxycyclopentyl group linked with a hetero atom (for example sulphur or preferably oxygen or nitrogen); there may be mentioned specifically:
bis-(2,3-epoxycyclopentyl)-ethers; basic diepoxy compounds, such as are obtained by reacting primary aromatic monamines, such as aniline, toluidine, or secondary aromatic diamines, such as 4,4'-di-(monomethylamino)-diphenylmethane, with epichlorohydrin, β-methylepichlorohydrin or dichlorohydrin in the presence of alkali.

Preferred use is made of diglycidyl ethers or diglycidyl esters, especially N,N'-diglycidyl compounds derived from heterocyclic nitrogen compounds.

Diglycidyl esters particularly suitable for the reaction with the dicarboxylic acid of the formula (I) according to the present process are those which are obtained by reacting a dicarboxylic acid with epichlorohydrin, β-methylepichlorohydrin or dichlorohydrin in the presence of alkali, such diesters may be derived from aliphatic dicarboxylic acids, such as succinic, adipic or sebacic acid, or from aromatic dicarboxylic acids such as phthalic, isophthalic or terephthalic acid, or especially from hydroaromatic dicarboxylic acids such as tetrahydrophthalic, hexahydrophthalic or 4-methylhexahydrophthalic acid. As examples there may be mentioned diglycidyl phthalate, diglycidyl terephthalate, diglycidyl tetrahydrophthalate and diglycidyl hexahydrophthalate.

The diglycidyl ethers used for the reaction with the dicarboxylic acid of the formula (I) according to the present process are especially those obtained by etherifying a dihydric alcohol or diphenol with epichlorohydrin, β-methylepichlorohydrin or dichlorohydrin in the presence of alkali; these compounds may be derived from glycols such as ethyleneglycol, diethyleneglycol, triethyleneglycol, 1,3-propyleneglycol, 1,4-butanediol, 1,5-pentanediol, 1,6-hexanediol, from nitrogenous dialcohols such as N-phenyldiethanolamine, and especially from diphenols such as resorcinol, pyrocatechol, hydroquinone, 1,4-dihydroxynaphthalene, bis-(p-hydroxyphenyl)-methane, bis-(p-hydroxyphenyl)-methylphenylmethane, bis-(p-hydroxyphenyl)-tolylmethane, 4,4'-dihydroxydiphenyl, bis-(p-hydroxyphenyl)-sulphone or preferably from bis-(p-hydroxyphenyl)-dimethylmethane.

There may be specially mentioned diglycidyl ethers derived from bis-(p-hydroxyphenyl)-dimethylmethane (bisphenol A) which correspond to the average formula

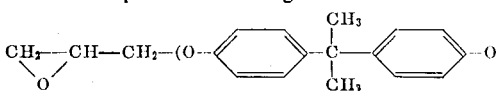

in which z is a small whole or fractional number, for example from 0 to 2.

As mentioned above, the N,N'-diglycidyl compounds derived from heterocyclic nitrogen compounds are distinguished by their specially good compatibility with the polyamide-dicarboxylic acids. Such preferably used N,N'-diglycidyl compounds are derived from heterocyclic nitrogen compounds containing more than one NH-group, for example ethylene-urea, propyleneurea, parabanic acid and especially from hydantoin or hydantoin derivatives, such as 5-monoalkyl-hydantoins or 5,5-dialkylhydantoins. There may be mentioned, for example, N,N'-diglycidyl-ethylene-urea and especially N,N'-diglycidyl-5,5-dimethyl-hydantoin.

It is, of course, also possible to use mixtures of two or more of the diepoxides mentioned above. It has proved particularly useful to add an N-containing diepoxy compound, for example N,N'-diglycidyl-5,5-dimethylhydantoin to a conventional aromatic or cycloaliphatic diglycidyl compound and cycloaliphatic diepoxy compound.

As optional additional crosslinking agent there may be used, for example, a triepoxy compound such as triglycidylisocyanurate or N,N', N''-tri(β-glycidyl-hydroxypropionyl)-hexahydro-s-triazine or a tricarboxylic acid such as tricarballylic acid.

Particularly good results have been obtained with N-containing triepoxy compounds such as triglycidyl-isocyanurate, because they possess apart from a low vapor pressure good compatibility with the polyamide-dicarboxylic acids.

Further preferred crosslinking agents are dicarboxylic acid anhydrides, for example phthalic, $\Delta^4$-tetrahydrophthalic, hexahydrophthalic, 4-methylhexahydrophthalic, 3,6-endomethylene-$\Delta^4$-tetrahydrophthalic, methyl-3,6-endomethylene-$\Delta^4$-tetrahydrophthalic (= methyl nadic anhydride), 3,4,5,6,7,7-hexachloro-3,6-endomethylenetetrahydrophthalic, succinic, adipic, azelaic, maleic, allylsuccinic, dodecenylsuccinic anhydride; 7-allylbicyclo(2.2.1)hept-5-ene-2,3-dicarboxylic anhydride, pyromellitic dianhydride or mixtures of such anhydrides.

Among the above-mentioned polycarboxylic acid anhydrides the following have proved specially useful: hexahydrophthalic, $\Delta^4$-tetrahydrophthalic, 4-methylhexahydrophthalic, 4-methyl-$\Delta^4$-tetrahydrophthalic, methylnadic and especially sebacic and dodecenylsuccinic anhydride.

According to the present invention the crystalline plastics are generally manufactured with simultaneous shaping to furnish castings, foam products, mouldings, lacquer films, laminates, adhesive bonds and the like. The procedure is this: A mixture of the dicarboxylic acid (I) and the diepoxide (II) and a possibly additionally used crosslinking agent (for example a dicarboxylic acid anhydride) is prepared, then poured into casting or press moulds, or brushed out to form coatings, or introduced into joints etc. and allowed to react at an elevated temperature until the plastic has been formed.

In the manufacture of shaped structures having a surface which is relatively large in relation to the mass, such as foils, coatings or the like, the additional use of an antioxidant, for example di-(tertiary butyl)-p-cresol may be advantageous.

Accordingly, the invention further includes moulding compositions which on heating furnish shaped structures, including two-dimensional flat structures, such as coatings or adhesive bonds, the said composition containing a polyamide-dicarboxylic acid of the formula (I) and a diepoxide of the formula (II) and, if desired, also an antioxidant and/or an additional crosslinking agent, especially a dicarboxylic acid anhydride.

The product contains for every equivalent of epoxide groups 0.8 to 1.1 equivalents of carboxyl group, when no additional crosslinking agent is present. When a dicarboxylic acid

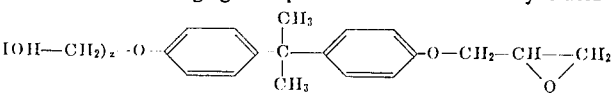

anhydride is used as crosslinking agent it is generally used in an amount of 0.05 to at most 0.3 mol for every equivalent of carboxyl groups of the dicarboxylic acid (I), and in this case the mixture should further contain an excess of 0.05 to 0.3 epoxide group equivalents of the diepoxy compound over and above the quantity required for the reaction with the dicarboxylic acid.

The diepoxide, the dicarboxylic acid and possible additives can, as a rule, be cast at an elevated temperature to form a low- to medium-viscous castable melt.

Within the melt the curing takes place, that is to say the conversion into the high-molecular crosslinked and infusible state within a short time, whereas the solid, crystalline resin+curing agent mixture can be stored at room temperature for a long time, that is to say for several months, without passing into the infusible state. Accordingly, the compositions of this invention are preferably suitable as powders for moulding compositions or coatings, for example for application by the flame-spraying or fluidized bed methods, or in form of solutions in an inert solvent as lacquer resins or paints for surface protection or for the manufacture of pre-impregnated tapes and fabric webs which are processed under pressure with heating to form laminates or shaped structures. Such shaped structures are distinguished by extreme toughness, which remains intact even at elevated temperatures.

Depending on the intended use the moulding compositions are admixed with additives such as fillers, reinforcing agents, anti-ageing substances (inhibitors), flameproofing agents, dyestuffs or pigments.

As fillers or reinforcing agents there may be used fibrous or pulverulent, inorganic or organic substances. As inorganic fillers there may be mentioned quartz meal, hydrated alumina, mica, aluminum powder, iron oxide, ground dolomite, ground chalk, gypsum, ground slate, unburnt kaolin (bolus), burnt kaolin (registered trade mark "Molochite") and as organic fillers wood meal and cellulose.

Suitable reinforcing agents are inorganic fibrous materials for examples glass fibers, boron fibers, carbon fibers, asbestos fibers, or organic natural or synthetic fibers such as cotton, polyamide fibers, polyester fibers or polyacrylonitrile fibers. Substrates suitable for the manufacture of compressed materials or laminates are, for example, woven fabrics, braided or knitted fabrics, fiber mats or fiber fleeces or fibrous materials. There may be mentioned paper, cottonwool, linen or cotton paper, canvas and preferably asbestos paper, mica paper, mats or woven fabrics of high-melting synthetics and especially glass fiber mats and fabrics.

Such laminates may be used, for example, for the manufacture of motorbody components.

Furthermore, the moulding compositions may be used in the unfilled or filled state as dipping or casting resins, floor coverings, potting or insulating materials for the electrical industry, as adhesives, for examples in form of adhesive foils, and also for the manufacture of such products.

Unless otherwise indicated, percentages in the following examples are by weight.

For the manufacture of the crystalline plastics described in the Examples the polyamide-dicarboxylic acids A – C described below were used:

Polyamide-dicarboxylic acid A
Polyamide containing carboxyl groups from sebacic acid and hexamethylenediamine (moleculare ratio 7:6).

a. Manufacture of the sebacic acid hexamethylenediamine salt. 472 g (2.33 mols) of sebacic acid are dissolved in 2,500 ml of methanol at 40° C. and a solution of 232 g (2 mols) of hexamethylenediamine (corresponding to a molecular ratio of dicarboxylic acid : diamine of 7:6) in 200 ml of methanol is added by drops over the course of 30 minutes at 45° – 50° C., whereupon increased salt formation occured during the addition in weakly exothermic conditions. The reaction mixture is then cooled to room temperature in atmosphere of nitrogen and stirred further for one hour. Filtration is effected afterwards, the filter residue washed with methanol and the combined filtrates are concentrated. The filter residue was dried and yielded 605.6 g of a colorless, crystalline product with a melting point of 154°–160° C. (uncorr.). It was possible to obtain a further 97.5 g of salt (melting point 150° – 158° C.) from the concentrate of the filtrate. The yield thus amounted to 99 percent of theory.

b. Manufacture of the polyamide.

703.1 g of the salt as obtained above were heated in atmosphere of nitrogen to a temperature of 220° C. in an autoclave fitted with a stirring mechanism, in the course of which an internal pressure of approx. 17 atmospheres gauge pressure was attained. With increasing splitting-off of water, an increase in pressure was observed, which from time to time was reduced from 19 to 15 atmospheres gauge pressure on each occasion. The greater part of the water of condensation was expelled in the process. The condensation was finished after approx. 4 hours and the reaction mixture was left to cool, whereupon it solidified to a yellow, crystalline substance which possessed an acid equivalent weight of 962 (theory 947) and a melting point of 210°–215° C.

Polyamide-dicarboxylic acid B
Polyamide containing carboxyl groups from adipic acid and hexamethylenediamine.

a. Manufacture of the adipic acid-hexamethylenediamine salt. 438 g (3 mols of adipic acid) are dissolved at 40° C. in 1,500 ml of methanol and a solution of 290 g (2.5 mols) of hexamethylenediamine (corresponding to a molecular ratio of dicarboxylic acid : diamine of 6 : 7) in 500 ml of methanol is added by drops over the course of 35 minutes at 40°–45° C., whereupon the rapid deposition of crystals occurred in weakly exothermic conditions. The resulting suspension was cooled to 5° C. after the dropwise addition had been completed, stirred for a further 30 minutes approx. and subsequently filtered. The filter residue was dried and 678 g of a colorless, crystalline product resulted, having a melting point of 190°–200° C., which corresponds to a yield of 93 percent.

b. Manufacture of the polyamide.

The product obtained above was heated in atmosphere of nitrogen to 250° C. in an autoclave fitted with a stirring mechanism, with the pressure being reduced to 10 atmospheres gauge pressure from time to time by carefully opening the valve. The greater part of the water of condensation that formed is liberated in the process. After a reaction time of approx. 3 hours, no further splitting-off of water was observed and the reaction mixture was left to cool to room temperature. The soilidified, light-brown melt had an acid equivalent weight of 519 (theory 638) and a melting point of 236°–242° C.

Polyamide-carboxylic acid C
Polyamide containing carboxyl groups from sebacic acid and bis-(4-aminocyclohexyl)-methane. Molecular ratio 5:4.

a. Manufacture of the dicarboxylic acid-diamine salt.

505 g (2.5 mols) of sebacic acid were dissolved in 2,500 ml of methanol at 40° C. and a solution of 420 g (2 mols) of bis-(4-aminocyclohexyl)-methane (corresponding to a dicarboxylic acid : diamine ratio of 5:4) in 400 ml of methanol was added by drops at 45°–50° C. After the dropwise addition, the reaction mixture was further stirred for 1 hour at the same temperature and subsequently concentrated. 910 g of a glassy substance was obtained.

b. Manufacture of the polyamide.

The product obtained above was heated in atmosphere of nitrogen to 230° C. in an autoclave fitted with a stirring mechanism, in the process of which a rise in pressure to 15 atmospheres gauge pressure was observed. The internal pressure was reduced from time to time by carefully opening the valve, whereby the water or condensation was expelled. The pressure was reduced in each case only to approx. 10 atmospheres gauge pressure. After a 3 hour reaction period at 230° C., no further splitting-off of water could be observed. The product is a light-brown, solidified substance with an acid equivalent weight of 629 (theory 853) and a glass conversion temperature of 70° C.

Process Examples

EXAMPLE 1

962 g (= 1.0 equivalent) of polyamide-dicarboxylic acid A were heated to 240° C. and mixed with 30.8 g (= 0.2 equivalent) of hexahydrophthalic anhydride. Afterwards, 260 g (= 1.3 equivalent) of an N,N-diglycidyl compound of the following structure

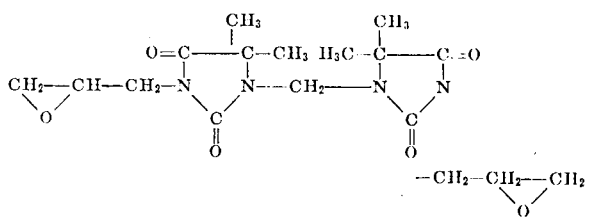

having an epoxide content of 5.0 epoxide equivalents per kg (epoxide resin I) were added at 240° C. After thorough mixing, the mixture was poured into the previously heated aluminum moulds (internal dimensions 135 × 135 × 2 mm) which had been treated with a release agent. After heating for 2 hours at 220° C., crystalline, elastic mouldings of excellent strength properties and toughness were obtained:

| | | |
|---|---|---|
| Tensile strength *) after stretching at raised temperature up to approx. 100% | = | 960 kg/cm² |
| Elongation at break after stretching | = | 100 % |
| Flexural strength according to ISO R 178 (in the unstretched state) | = | 520 kg/cm² |
| Crystallization conversion temperature (in the unstretched state) | = | 202 °C |
| Crystallization conversion temperature (in the stretched state) | = | 194 °C |

*) The stretching process was carried out on strips measuring 50 × 6.5 × 2 mm. The test mouldings were slowly cooled after the stretching as indicated had been carried out.

EXAMPLE 2

519 g (1.0 equivalent) of polyamide-carboxylic acid B were heated to 260° C. and mixed with 30.8 g (= 0.2 equivalent) of hexahydrophthalic anhydride. Afterwards, 260 g (= 1.3 equivalent) of epoxide resin I were added at 240° C., well mixed and processed and cured in accordance with Example I. Mouldings of the following characteristics were obtained:

| | | |
|---|---|---|
| Flexural strength according to ISO R 178 | = | 600 kg/cm² |
| Crystallization temperature | = | 177 °C |

COMPARATIVE EXAMPLE

According to Example 1, mouldings were made by using dicarboxylic acid C which does not fall under the claim: 629 g (= 1.0 equivalent) of the polyamide-dicarboxylic acid C were heated to 230°C and mixed with 30.8 g (= 0.2 equivalent) of hexahydrophthalic anhydride. Afterwards, 260 g (= 1.3 equivalent) of epoxide resin I were added at 230° C. and after thorough mixing; the mixture was poured into the moulds in accordance with Example 1. After heating for 2 hours at 220° C., transparent, glassy polymers were obtained:

| | | |
|---|---|---|
| Flexural strength after stretching as in Example 1 | = | 830 kg/cm² |
| Elongation at break after stretching as in Example 1 | = | 1 % |

No crystallization conversion temperature could be ascertained in the mouldings, which are thus not crystalline, but glassy. They accordingly also exhibit a brittle tendency to break; therefore to all intents and purposes cannot be stretched and so do not possess the good qualities of the crystalline mouldings manufactured according to the invention.

EXAMPLE 3

96.2 g (= 1.0 equivalent) of polyamine-dicarboxylic acid A were heated to 240° C. and mixed with 53.2 g (= 0.2 equivalent) of dodecenylsuccinic anhydride. 519 g (= 1.3 equivalent) of a diglycidyl ether of 2,2-bis-(p-hydroxyphenyl)-propane having an epoxide content of 2.5 equivalents per kg (epoxide resin II) were subsequently added at 240° C. After thorough mixing, the mixture was poured into the moulds in accordance with Example 1 and subjected to a heat treatment for 2 hours at 220° C. Crystalline, elastic mouldings with the following characteristics were obtained:

| | | |
|---|---|---|
| Flexural strength after stretching according to Example 1 | = | 620 kg/cm² |
| Elongation at break after stretching according to Example 1 | = | 10 % |
| Crystallization conversion temperature in the unstretched state | = | 197 °C |
| Crystallization temperature in the stretched state | = | 197 °C |

We claim:

1. A curable composition of matter which can be converted into a crystalline plastic material at an elevated temperature, which comprises (1) a long-chain polyamide-dicarboxylic acid of the formula

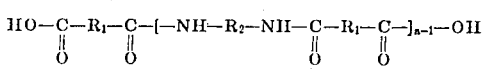

in which $R_1$ and $R_2$ each are members selected from the group consisting of branched alkylene, linear alkylene, branched alkenylene and linear alkenylene residue, and a is an integer of at least 2, and (2) diepoxide, and in which composition for every epoxide group equivalent of diepoxide (2) 0.9 to 1.1 equivalent of carboxyl group of polyamide-dicarboxylic acid (1) is present.

2. A curable composition of matter which can be converted into a crystalline plastic material at an elevated temperature, which comprises (1) a long-chain polyamide-dicarboxylic acid of the formula

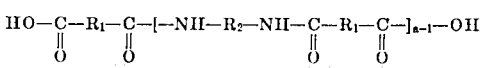

in which $R_1$ and $R_2$ each are members selected from the group consisting of branched alkylene, linear alkylene, branched alkenylene and linear alkenylene residue, and a is an integer of at least 2 and at most 10, and (2) diepoxide, and in which composition for every epoxide group equivalent of diepoxide (2) 0.9 to 1.1 equivalent of carboxyl group of polyamide-dicarboxylic acid (1) is present.

3. A composition as claimed in claim 1, containing a diepoxide (2) having an epoxide equivalent weight not exceeding 500.

4. A composition as claimed in claim 3 containing a diepoxide (2) having an epoxide equivalent weight of 100 to 250.

5. A composition as claimed in claim 1, containing a diepoxide (2) whose molecule contains on an average more than one member selected from the group consisting of glycidyl group and 2,3-epoxycyclopentyl group, said member being bound to a hetero atom.

6. A composition as claimed in claim 5, containing as diepoxide (2) an N,N'-diglycidyl derivative of a N-heterocyclic compound.

7. A composition as claimed in claim 5, wherein the diepoxide (2) has the formula

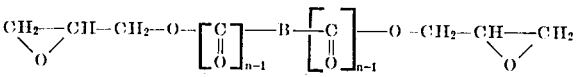

in which B represents a bivalent residue selected from the group consisting of aliphatic, cycloaliphatic, araliphatic and aromatic bivalent residue, and n is an integer of at least 1 and at most 2.

8. A curable composition of matter as claimed in claim 1, which contains additionally as crosslinking agent a dicarboxylic acid anhydride, and in which for every equivalent of carboxyl group of the polyamide-dicarboxylic acid (1), 0.05 to 0.5 mol of a dicarboxylic acid anhydride and an excess of 0.05 to 0.5 epoxide group equivalent of the diepoxide (2) over the quantity prescribed for the reaction with the polyamide-dicarboxylic acid alone, are present.

9. A composition as claimed in claim 8, wherein per equivalent of carboxyl group of the polyamide dicarboxylic acid, 0.1 to 0.2 mol of a dicarboxylic acid anhydride and an excess of 0.1 to 0.2 epoxide group equivalent of the diepoxide over the quantity prescribed for the reaction with the polyamide dicarboxylic acid alone, are present.

* * * * *